(12) United States Patent
Huffer

(10) Patent No.: US 11,383,888 B2
(45) Date of Patent: Jul. 12, 2022

(54) FLEXIBLE PACKAGING WITH INTERNAL RELEASE

(71) Applicant: Sonoco Development, Inc., Hartsville, SC (US)

(72) Inventor: Scott William Huffer, Hartsville, SC (US)

(73) Assignee: SONOCO DEVELOPMENT, INC., Hartsville, SC (US)

( * ) Notice: Subject to any disclaimer, the term of this patent is extended or adjusted under 35 U.S.C. 154(b) by 0 days.

(21) Appl. No.: 17/240,289

(22) Filed: Apr. 26, 2021

(65) Prior Publication Data
US 2021/0245926 A1    Aug. 12, 2021

Related U.S. Application Data

(62) Division of application No. 16/654,574, filed on Oct. 16, 2019, now Pat. No. 11,021,300.

(51) Int. Cl.
*B65D 65/42* (2006.01)
*B65D 30/08* (2006.01)
(Continued)

(52) U.S. Cl.
CPC .......... *B65D 31/02* (2013.01); *B29C 66/4322* (2013.01); *B65D 65/42* (2013.01); *B65D 75/5855* (2013.01); *B29L 2031/7129* (2013.01)

(58) Field of Classification Search
CPC .... B65D 31/02; B65D 65/42; B65D 75/5855; B29C 66/4322; B29L 2031/7129
(Continued)

(56) References Cited

U.S. PATENT DOCUMENTS 5,181,610 A    1/1993   Quick et al.
5,763,028 A    6/1998   Matsumoto
(Continued)

FOREIGN PATENT DOCUMENTS

EP    0955243 A2    11/1999
EP    2208604 A1    1/2010
(Continued)

OTHER PUBLICATIONS

International Search Report and Written Opinion for International Application No. PCT/US2020/043009; dated Oct. 28, 2020; 12 pages.

*Primary Examiner* — Peter N Helvey
(74) *Attorney, Agent, or Firm* — Nelson Mullins Riley & Scarborough LLP

(57) ABSTRACT

The invention comprises a package for reactive materials comprising a panel defining a first end, a second end opposite the first end, and at least two side edges. The panel comprises at least one film layer, an adhesive adjacent the film layer, wherein the adhesive is pattern applied such that it is disposed within an interior region of the film layer and wherein a perimeter of the film layer is adhesive-free adjacent each of the first end, second end, and side edges, and a release liner comprising a substrate layer and a cured silicone layer. The release liner is adhered to the film layer via the adhesive, the substrate layer of the release liner is disposed adjacent the film layer, and a perimeter of the release liner is smaller than the perimeter of the film structure. In an embodiment, the panel comprises a tubular body and the side edges are sealed together to form a fin seal, the first end is sealed closed to form an end seal, and the second end is sealed closed to form an end seal.

18 Claims, 5 Drawing Sheets

(51) Int. Cl.
*B29C 65/00* (2006.01)
*B65D 75/58* (2006.01)
*B29L 31/00* (2006.01)

(58) Field of Classification Search
USPC .......................................................... 383/116
See application file for complete search history.

(56) References Cited

U.S. PATENT DOCUMENTS

| | | | |
|---|---|---|---|
| 6,599,639 | B2 | 7/2003 | Dayrit |
| 6,783,857 | B2 | 8/2004 | Anada |
| 7,626,071 | B2 | 12/2009 | Masini |
| 7,650,994 | B2 | 1/2010 | Ninomiya |
| 7,921,999 | B1* | 4/2011 | Kimball ............... A61K 9/703 |
| | | | 206/440 |
| 8,763,351 | B2 | 7/2014 | Corrado |
| 8,920,392 | B2 | 12/2014 | Gochnour |
| 9,271,879 | B2 | 3/2016 | Stone |
| 2005/0175802 | A1 | 8/2005 | Kaffl et al. |
| 2006/0021891 | A1 | 2/2006 | Shiokawa |
| 2006/0021898 | A1* | 2/2006 | Shiokawa ............... B65D 65/20 |
| | | | 206/524.1 |
| 2006/0083875 | A1 | 4/2006 | Weaver |
| 2006/0151414 | A1 | 7/2006 | Mullen et al. |
| 2013/0118128 | A1 | 5/2013 | Luecke et al. |
| 2014/0083878 | A1 | 3/2014 | Tang et al. |
| 2016/0087250 | A1 | 3/2016 | Gu et al. |
| 2016/0362237 | A1* | 12/2016 | Mussell ............... B65D 65/42 |
| 2017/0025648 | A1 | 1/2017 | Yu et al. |

FOREIGN PATENT DOCUMENTS

| | | |
|---|---|---|
| JP | H 08-207966 A | 8/1996 |
| KR | 200192655 Y1 | 8/2000 |
| KR | 207291206 U | 9/2016 |
| KR | 20160103690 A | 9/2016 |

\* cited by examiner

“FLEXIBLE PACKAGING WITH INTERNAL RELEASE”

FLEXIBLE PACKAGING WITH INTERNAL RELEASE

CROSS-REFERENCE TO RELATED APPLICATIONS

This application claims priority to U.S. Non-Provisional patent application Ser. No. 16/654,574, filed Oct. 16, 2019, entitled "FLEXIBLE PACKAGING WITH INTERNAL RELEASE", wherein the foregoing is incorporated by reference in its entirety herein.

FIELD OF THE INVENTION

The present disclosure relates in general to packaging for food products, and more particularly to flexible bags and pouches which comprise an internal layer or coating which allows the packaging to be used with reactive products.

BACKGROUND

It is desirable to use flexible materials, such as polymers and flexible films, to package and contain reactive and highly reactive materials. That is, the materials contained within the package may be designed to react after being placed into the packaging and/or after the packaging is sealed. For example, it may be desirable to provide a flexible polymeric packaging structure which allows an internal reaction of certain polymers. However, in some cases, as the reactive materials within the packaging react, the reactive materials may cross-link with the polymeric layers and/or sealant layer of the packaging structure. In this case, the packaging cannot be opened and/or significant difficulty is encountered upon opening of the packaging. In some cases, the reactive materials/packaging must be soaked for a number hours to release the cross-linking before the reactive material can be removed from the packaging. Thus, the present invention provides a flexible polymeric packaging structure which allows an internal reaction to occur without adversely affecting the packaging structure or the materials contained therein.

BRIEF SUMMARY

Accordingly, in an embodiment, the present invention provides a polymeric-based packaging structure which utilizes a release liner, wherein the release liner comprises a substrate layer and a silicone layer. In an embodiment, the silicone layer may comprise cured silicone. The substrate layer of the release liner may be laminated to a mono-ply or multi-ply film layer which comprises the packaging structure. In any case, the silicone layer of the release liner faces the interior of the packaging structure and is designed to be adjacent the reactive materials. In an embodiment, however, the silicone layer is not disposed within the seal regions of the packaging structure. That is, the seal regions of the packaging structure are silicone-free.

In an embodiment, the polymeric film structure may comprise nylon, polyethylene (PE), a PE-based sealant, a combination thereof, or any other mono-layer or multi-layer polymeric materials, as discussed more fully below. In an embodiment, the film layer may comprise a co-extruded PE-based sealant layer and a nylon layer, wherein nylon layer comprises the outer layer of the packaging materials. In an embodiment, the PE or PE-based sealant is print receptive, which allows for adhesive bonding to a PET release liner.

In an embodiment, the invention comprises a package for reactive materials comprising a panel defining a first end, a second end opposite the first end, and at least two side edges. The panel comprises at least one film layer, an adhesive adjacent the film layer, wherein the adhesive is pattern applied such that it is disposed within an interior region of the film layer and wherein a perimeter of the film layer is adhesive-free adjacent each of the first end, second end, and side edges, and a release liner comprising a substrate layer and a cured silicone layer. The release liner is adhered to the film layer via the adhesive, the substrate side of the release liner is disposed adjacent the film layer, and a perimeter of the release liner is smaller than the perimeter of the film structure. In an embodiment, the panel comprises a tubular body and the side edges are sealed together to form a fin seal, the first end is sealed closed to form an end seal, and the second end is sealed closed to form an end seal. The cured silicone layer of the release liner faces the interior of the package.

In another embodiment, the invention comprises a blank for forming a package comprising a panel defining a first end, a second end opposite the first end, and at least two side edges. The panel comprises, in an embodiment, at least one film layer, an adhesive adjacent the film layer, wherein the adhesive is pattern applied within an interior region of the film layer and wherein a perimeter of the film layer is adhesive free adjacent each of the first end, second end, and side edges. The release liner comprises a substrate layer or side and a cured silicone layer or side. The release liner is adhered to the film layer via the adhesive and the substrate side of the release liner is disposed adjacent the film layer. A perimeter of the release liner is smaller than the perimeter of the film layer.

In another embodiment, the invention comprises a method of manufacturing a blank for a package comprising providing a film layer, providing a release liner comprising a substrate layer and a cured silicone layer, pattern applying an adhesive onto the film layer or the substrate layer of the release liner such that a perimeter region of the film layer remains adhesive-free, adhesively joining the film layer to the substrate layer of the release liner to form a laminate, advancing the laminate to a scoring station at which an inner score line is formed through the thickness of the release liner but does not extend into the film layer, wherein the inner score line is disposed interior of the perimeter region, and wherein an outer score line is formed through the thickness of the laminate, and removing a skeleton of the release liner, wherein the skeleton comprises the portion of the release liner exterior the inner score line, wherein after removal of the skeleton, a region between the inner score line and the outer score line comprises a seal region in which the film layer is exposed.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DRAWINGS

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

In some embodiments, the package may comprise a flexible film which is configured cylindrically, has a fin seal, and is end sealed on each side of the cylindrical shape. Said alternatively, the packaging may comprise a tubular body having opposed sealed end portions. In other embodiments, a package is provided that includes a front panel and a rear panel. The front and rear panel may comprise a single panel which is folded over itself, in an embodiment. The folded edge of the front and rear panel may comprise a top or bottom of the packaging. The side edges and the edge which is opposite the folded edge, in this embodiment, may each be sealed closed.

In another embodiment, a package is provided wherein the package comprises a front panel defining a top end, a bottom end, and two side edges, as well as a back panel defining a top end, a base end, and two side edges. In an embodiment, the back panel is connected to the front panel via seams formed along respective side edges, top end, and bottom end of the front and back panels. One or more additional panels, such as a bottom panel, may be included as well.

In some embodiments, the pouch may be a pillow pouch, bag, stand-up pouch, fitment pouch, envelope pouch, gusseted pouch, or any other flexible packaging structure. In an embodiment, the package may include a front and back panel joined by three, four, or more seams. In an embodiment, the seams or seals are heat seals. As used herein, "heat sealing" is contemplated to include direct application of heat, for example, with resistance heaters; heat application through ultrasonic waves; and other methods of producing heat. However, one skilled in the art will understand that the invention is not limited to heat activated adhesives and that the heat activated adhesives described herein are not limiting.

Figure 1A:
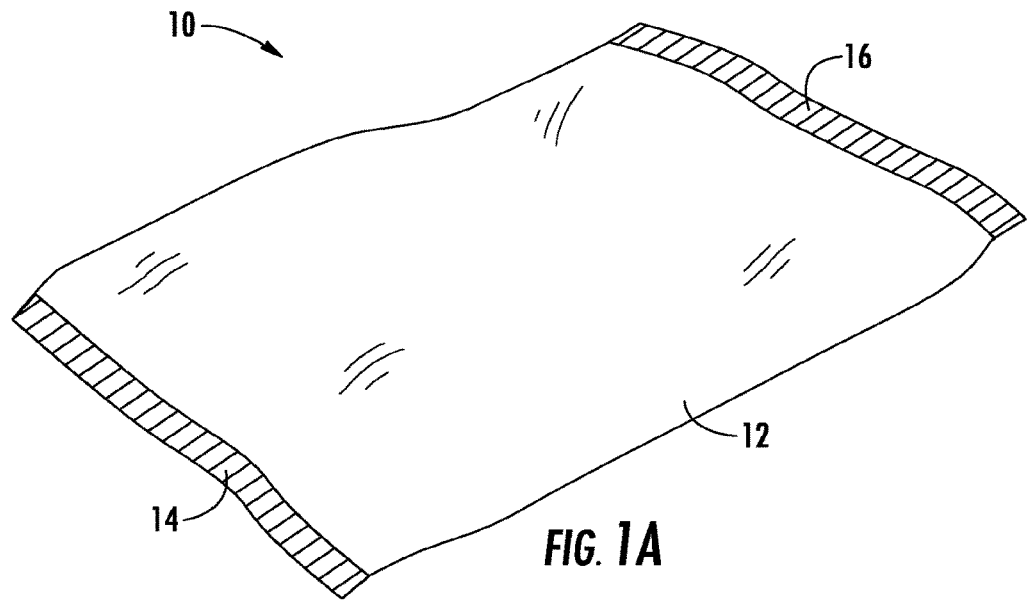
FIG. 1A is a perspective top view of a package in an embodiment of the invention.
Figure 1B:
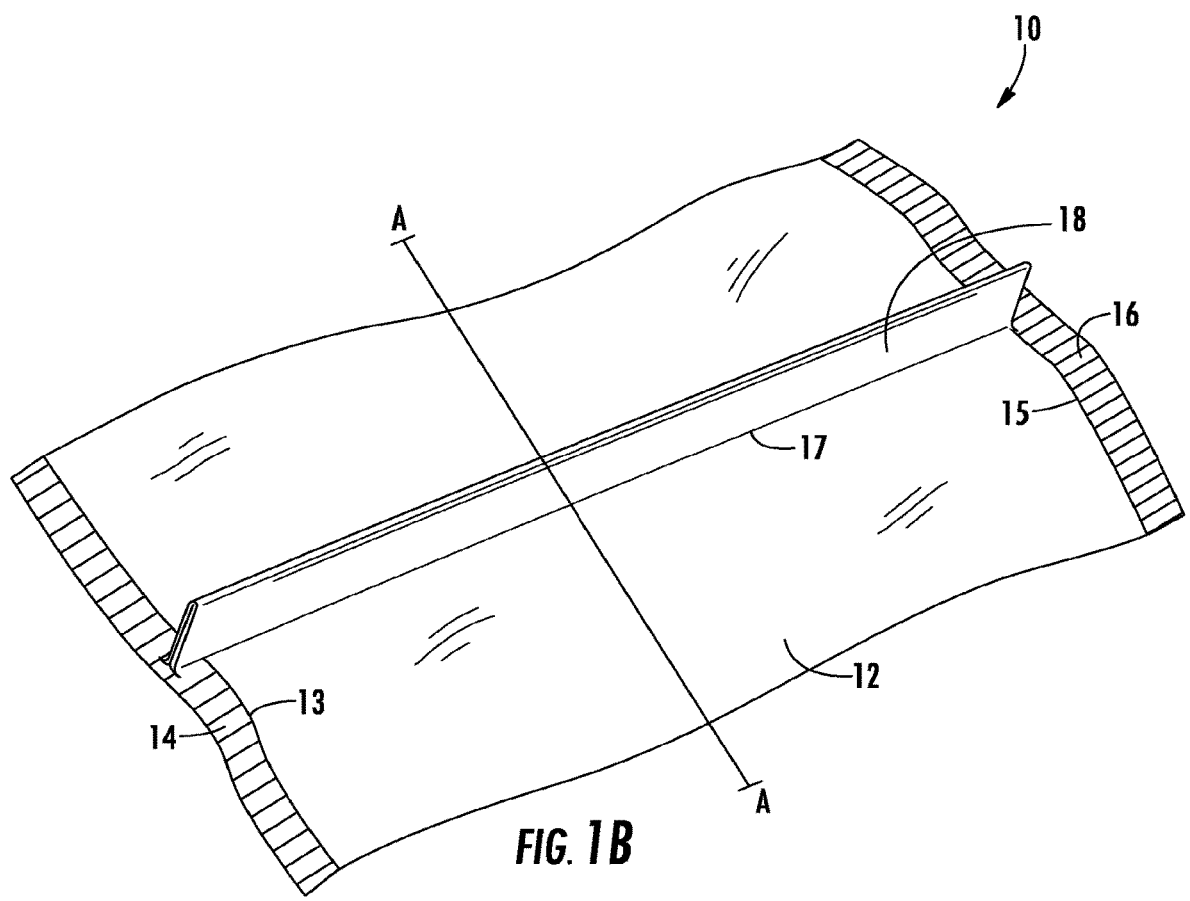
FIG. 1B is a perspective bottom view of a package in an embodiment of the invention.

Referring to the figures, wherein like numerals are used to identify like elements throughout, there are shown embodiments of a flexible package which is generally designated by reference numeral 10. The package 10 in FIG. 1 is in the form of a hollow tube with sealed ends and having a generally rectangular construction, but the package 10 may have any desired shape. In an embodiment, the package 10 includes a generally elongated body 12 with two end seals 14, 16 and a fin seal 18 which may seal the two side edges together. In an embodiment, the package 10 is formed from a web material. In an embodiment, a form, fill and seal machine may be used to manufacture the packages on a continuous basis. The seals 14, 16, 18 may be created by the combination of heat and pressure, the use of adhesives, or any other known means. The body portion 12 defines an interior volume 80 for retaining products or materials.

Generally speaking, to form the tubular packaging structure, the inventive laminate may be slit to an appropriate width (if necessary), formed into a tubular structure with the opposed side edges overlapped and the opposed side edges may then be heat sealed to form the fin seal 18. The inside surface of one edge may be sealed to the inside surface of the opposed edge with the seal extending substantially perpendicular to the elongated body 12. Such a seal can extend in a direction independent of the adjacent portion of the elongated body 12, but absent folding or other influence, tends to extend perpendicular thereto.

The package may include a first end seal 14 and a second end seal 16, which may be formed by collapsing the opposing ends of the tubular structure between heat seal jaws and forming seals between the opposed sides. In an embodiment, the package may be filled with a product after forming the fin seal 18 and the first end seal 14, but prior to forming the second end seal 16.

Figure 2:
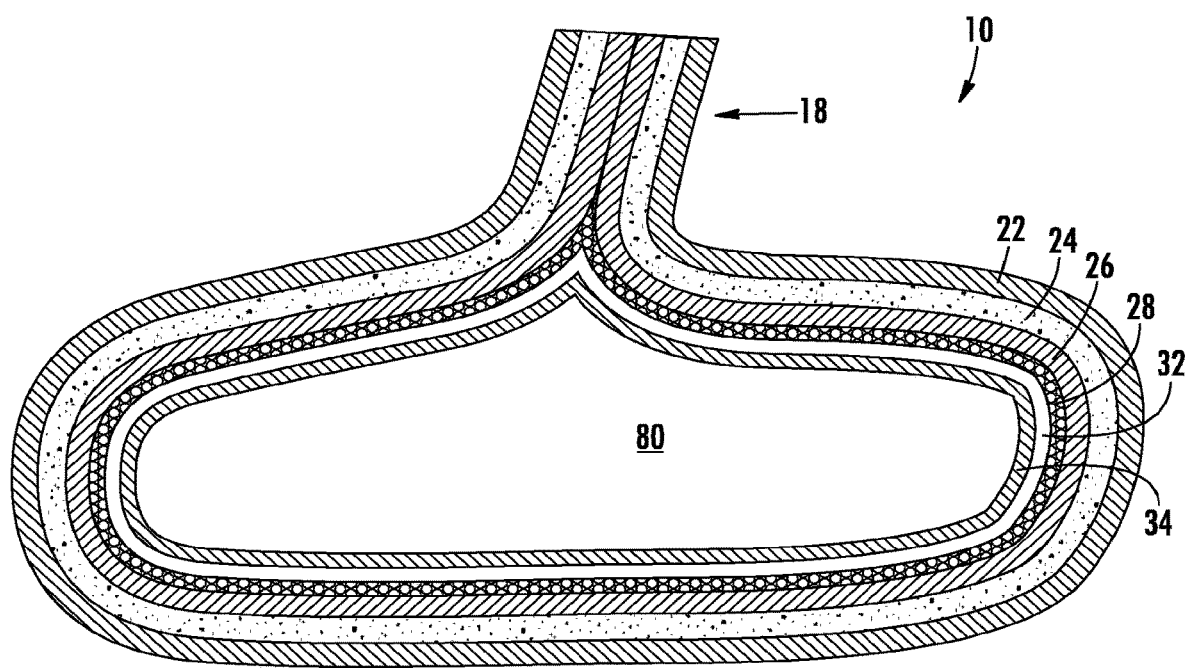
FIG. 2 is a cross-sectional view of a package in an embodiment of the invention, taken across line A-A shown in FIG. 1B.
Figure 3:
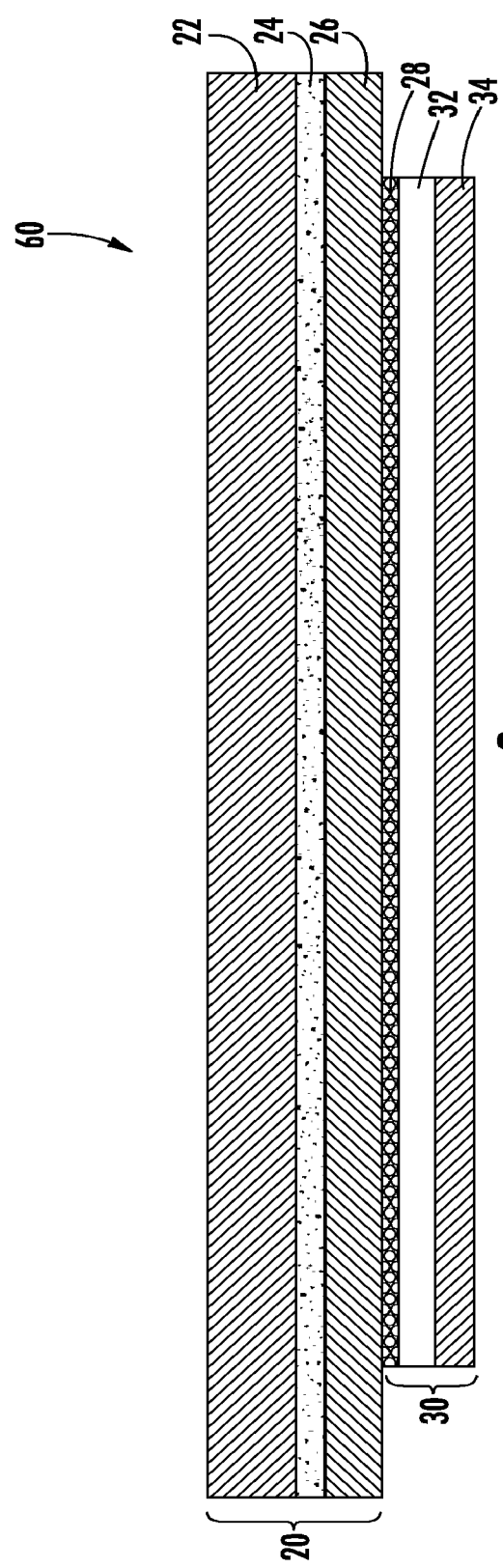
FIG. 3 is a cross-sectional view of a blank that may be used to form packages in an embodiment of the invention.

FIG. 2 illustrates a cross-sectional view of the package of FIG. 1, taken along line A-A. In this embodiment, multiple layers of the packaging structure may be viewed. FIG. 3 shows another cross-sectional view of a blank that could be used to form the package of FIG. 1. In an embodiment, the packaging structure comprises at least one film layer 20. In the depicted example, the packaging structure comprises two layers 20 adhered by an adhesive (FIG. 3). Any adhesive known in the art may be utilized to adhere the layers 20.

In a multi-layer embodiment, the film layer 20 comprises an outer layer 22. The outer layer 22 may comprise any flexible polymer known in the art. In a particular embodiment, the outer layer 22 comprises nylon. In a particular embodiment, the outer layer 22 comprises biaxially oriented nylon (BON).

In an embodiment, an adhesive 24 is disposed on the interior surface of the outer layer 22. The adhesive may adhere the outer layer 22 to a printable sealant 26. In other embodiments, an adhesive may not be necessary. In an embodiment, the printable sealant 26 is coextensive with the outer layer 22. That is, the printable sealant 26 and the outer layer 22 may have the same or substantially the same length and width. The printable sealant 26 may extend to the edges of the outer layer 22. In an embodiment, the printable sealant 26 may comprise any printable sealant known in the art. In an embodiment, the printable sealant 26 may comprise PE or may be PE-based. In a particular embodiment, the outer layer 22, the optional adhesive 24, and the printable sealant 26 may be coextruded. Any method of coextrusion may be utilized in this embodiment. In an embodiment, the printable sealant 26 has a thickness of between approximately 3 mils and 4 mils. In an embodiment, the printable sealant 26 has a thickness of approximately 3.5 mils. In an embodiment, the printable sealant 26 is print receptive and can be bonded to PET.

In other embodiments, the film 20 may comprise a single polymeric layer, which may be any flexible polymer known in the art. For example, the film 20 may comprise a single layer of print receptive PE.

In an embodiment, a release liner 30 is adhered to the film layer 20. In a particular embodiment, the film layer 20 comprises at least a printable sealant layer 26 and the release liner 30 is adhered to the printable sealant layer 26. In an embodiment, the release liner 30 comprises at least two layers. In an embodiment, the innermost layer 34 (with reference to the interior of the packaging) of the release liner 30 may comprise silicone or cured silicone. The silicon layer 34 may be the layer which faces the interior of the packaging structure, adjacent any reactive materials. The substrate layer 32 of the release liner 30 adjacent the printable sealant 26 may comprise PET, oriented polypropylene (OPP), or paper, in an embodiment. An adhesive 28 may be utilized to adhere the substrate layer 32 to the printable sealant 26. In some embodiments, the substrate layer 32 is referred to herein as a PET layer.

In an embodiment the release liner 30 is not coextensive with the film layer 20 (and/or outer layer 22 and/or printable sealant 26). That is, in an embodiment, the release liner 30 may be have a smaller length and width than the film layer 20 (and/or outer layer 22 and/or printable sealant 26). More particularly, the release liner 30 may be sized and disposed such that it does not extend into the heat seal areas 14, 16, 18 of the packaging structure 10. This is important to the invention because if the release liner 30 (and particularly if the silicone layer) extends into the seal areas 14, 16, 18, the end seals and/or fin seal could not be functionally and securely sealed. The release liner 30 would block the ability of the sealant 26 to seal. Thus, in an embodiment, the the heat seal areas 14, 16, 18 of the packaging structure 10 are silicone-free.

Figure 4:
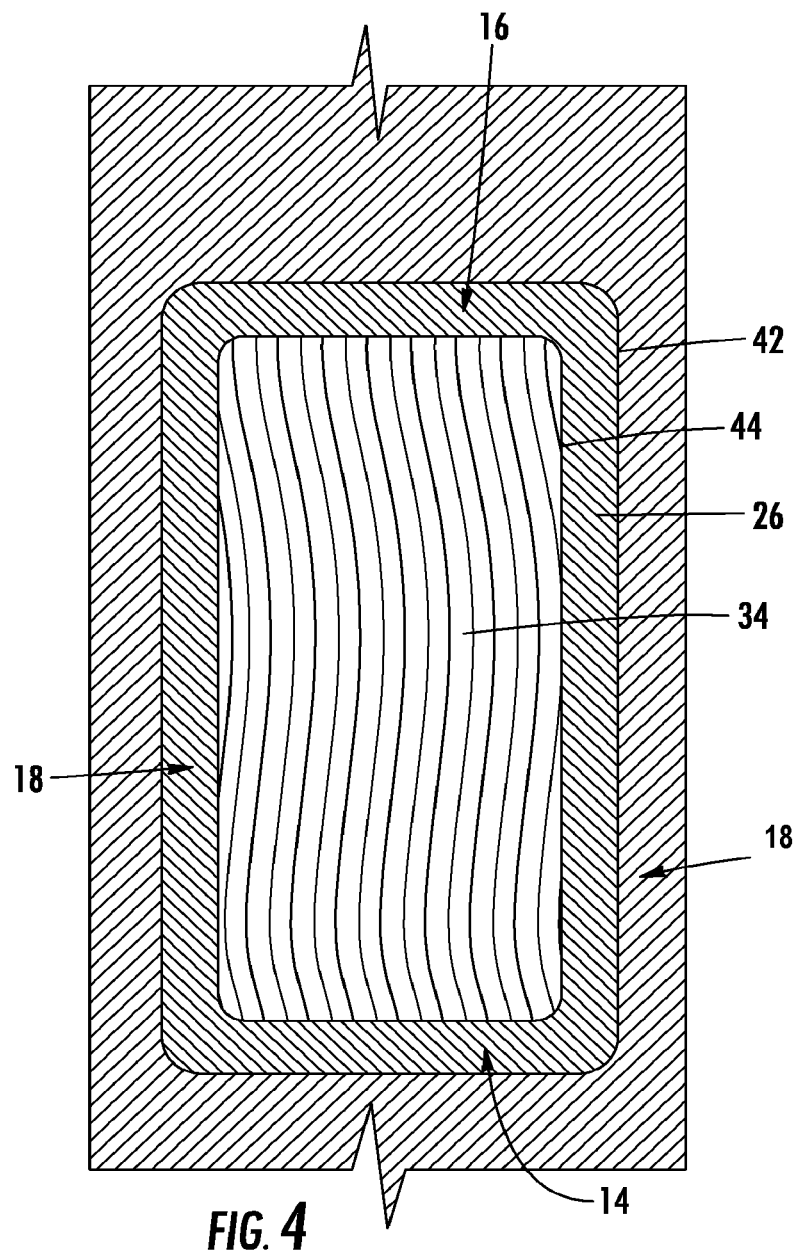
FIG. 4 is a top view of a blank that may be used to form packages in an embodiment of the invention.

Thus, in an embodiment, the adhesive 28 disposed between the release liner 30 and the printable sealant 26 may be pattern applied such that it does not extend into the seal areas 14, 16, 18 of the packaging structure 10. Similarly, after the release liner 30 is laminated to the film layer 20 (and/or printable sealant 26), the release liner 30 may be scored to form cut line 44 (FIG. 4) which defines the perimeter of the release liner 30. Cut line 44 may be disposed interior of the perimeter of the film structure 10. In an embodiment, the area between the perimeter of the film layer 10 and the perimeter of the release liner 30 comprises a seal area for forming a package. In an embodiment, the perimeter of the release liner 30 is substantially aligned with the perimeter of the adhesive 28.

Thus, the release liner 30 does not extend into the seal areas 14, 16, 18 of the packaging structure 10. That is, the release liner 30 may be disposed throughout the interior of the packaging structure, but may, for example, terminate at or adjacent the inside edge 13, 15 of the end seams 13, 15. Likewise, the release liner 30 may terminate at or adjacent the inside edge 17 of the fin seal 18.

The construction of the invention allows the film layer 20 (and/or printable sealant 26) to seal to itself along the seal areas 14, 16, 18 of the packaging structure 10 while simultaneously allowing the innermost silicone layer 34 to face the interior of the packaging, where reactive materials may be contained.

In an embodiment, the reactive materials may comprise any materials which will react with a polymer. In an embodiment, the reactive materials may comprise materials that will react with a printable sealant. In an embodiment, the reactive materials may comprise materials that will react with a polyethylene sealant. In an embodiment, the reactive materials are two-component mixtures. The silicone layer 34 will separate the packaging structure from the internal chemical reaction and will prevent cross-linking of the reactive materials with the packaging structure 10. After the internal reaction occurs, the reacted materials may be removed from the packaging structure 10 without concern of the reactive materials becoming cross-linked with the packaging structure 10. In effect, the silicone layer 34 becomes a shield between the packaging structure 10 and the reactive materials contained therein.

While the materials contained within the packaging are described as reactive materials, any materials that would benefit from a release liner may be utilized. For example, tacky or sticky materials may be enclosed within the packaging structure in an embodiment of the invention and may, thus, release easily from the packaging structure.

The various adhesives discussed herein may be the same adhesive or different adhesives. The adhesives may be permanent adhesives, heat seal adhesives, or any other type of adhesive. While the seams herein are discussed as being heat seals, it should be understood that any seam or seal which creates a permanent adhesion between two panels and can be successfully subjected to pasteurization, retort, hot fill, boiling, or the like, may be utilized. Thus, in some cases, the seams may be sealed via a cold seal or using any permanent adhesive known in the art.

In some cases, the packages may be gusseted to form stand-up pouches. Thus, a base panel may be connected to base ends of the respective front and back panels to form the base of the stand-up pouch. In such cases, the release liner 30 may be disposed on the interior of the front panel, back panel, and base, but the packaging structure may be release liner-free in any seams between the various panels.

While the outer layer 22 is discussed herein as comprising nylon, it may comprise any material known in the art. In an embodiment, the packaging material 20 and/or the outer layer 22 comprises a single polymer, such that it may be easily recycled. In an embodiment, the packaging material may comprise polyethylene (PE) or polypropylene (PP). In an embodiments, the packaging material may comprise polyethylene terephthalate, low density polyethylene, medium density polyethylene, high density polyethylene, linear low density polyethylene, oriented PE or PP, polyesters, polyolefins (including homopolymers and copolymers), polyamides, or any other flexible polymeric material known in the art. and others. In some embodiments, the film layer 20 and/or the outer layer 22 may comprise one or more layers of paper, metal foil, and the like.

In an embodiment, a method is provided. In the method, an outer layer 22 may be coextruded, optionally with an adhesive 24, and with a printable sealant layer 26. The extrusion process may comprise blown film or cast film extrusion, in certain embodiments.

Alternatively, an outer layer 22 may be lamination adhered to a printable sealant layer 26. In this embodiment, the outer layer 22 may be advanced from a supply roll by suitable web driving and handling equipment to an optional print station comprising a printing apparatus, such as a rotogravure printer or the like, for printing graphics and/or indicia on the first structure by applying inks to a surface of the first structure. The outer layer 22 may comprise one or more layers of flexible packaging material. In an embodiment, prior to printing the outer layer 22 in the print station, the surface of the outer layer 22 that is subsequently laminated to the printable sealant 26 can be treated by a corona discharge or flame treatment apparatus to render the surface more receptive to the inks and/or to render the surface more readily bondable to the adhesive 24 and/or printable sealant 26 that is subsequently applied to or adhered to the surface as described below. Alternatively, the outer layer 22 can have already been so treated prior to being wound into the supply roll, such that the treatment apparatus is unnecessary.

Following the optional corona/flame treatment and/or optional printing operation, the outer layer 22 is advanced to a first adhesive application station at which a permanent adhesive 24 is applied to the outer layer 22. The adhesive 24 may be applied without registration and may flood coat or cover the entire surface of the outer layer 22. Alternatively, the adhesive 24 may be applied in a predetermined pattern that recurs at regular intervals along the lengthwise direction of the outer layer 22. The predetermined pattern may be in the form of a strip of various forms or shapes. The adhesive application station can comprise a gravure roll in an embodiment.

After application of the adhesive 24, the outer layer 22 may be advanced to a dryer such as an oven or the like, to dry or partially dry the adhesive 24. The outer layer 22 is then advanced to a laminating station, comprising a pair of rolls forming a nip therebetween. The outer layer 22 is passed through the nip along with a printable sealant 26 that is advanced from its own supply roll, and the outer layer 22 and printable sealant 26 are laminated to each other to form laminate 20. The resulting laminate 20 may then be advanced to a reel-up where it is wound into a roll for subsequent processing in the second phase of the manufacturing process as described below. Alternatively, it is possible for the reel-up operation to be omitted, such that the laminate is directly advanced to the second phase.

In the second phase, a release liner 30 is provided. The release liner may comprise a layer of PET 32 and a layer of cured silicone 34. In the second phase, the laminate 20 and/or the release liner 30 is advanced to a second adhesive application station at which a permanent adhesive 28 is applied to the printable sealant 26 of the laminate 20 and/or the PET layer 32 of the release liner 30. In this phase, the adhesive 28 is applied in a predetermined pattern that recurs at regular intervals along the lengthwise direction of the film structure. The predetermined pattern is generally in the form of a square, rectangle, or other form or shape which may depend on the final geometry of the packaging structure. As illustrated, a preferred shape for the strip pattern is generally rectangular; however, other shapes for the pattern can be used. The invention not limited to any particular pattern. The adhesive application station can comprise a gravure roll in an embodiment.

After application of the adhesive 28, the layer to which the adhesive was applied may be advanced to a dryer such as an oven or the like, to dry or partially dry the adhesive 28. The laminate 20 and release liner 30 are then advanced to a laminating station, comprising a pair of rolls forming a nip therebetween. The laminate 20 and release liner 30 are passed through the nip and laminate 20 and release liner 30 are laminated to each other to form the packaging film 60.

Figure 5:
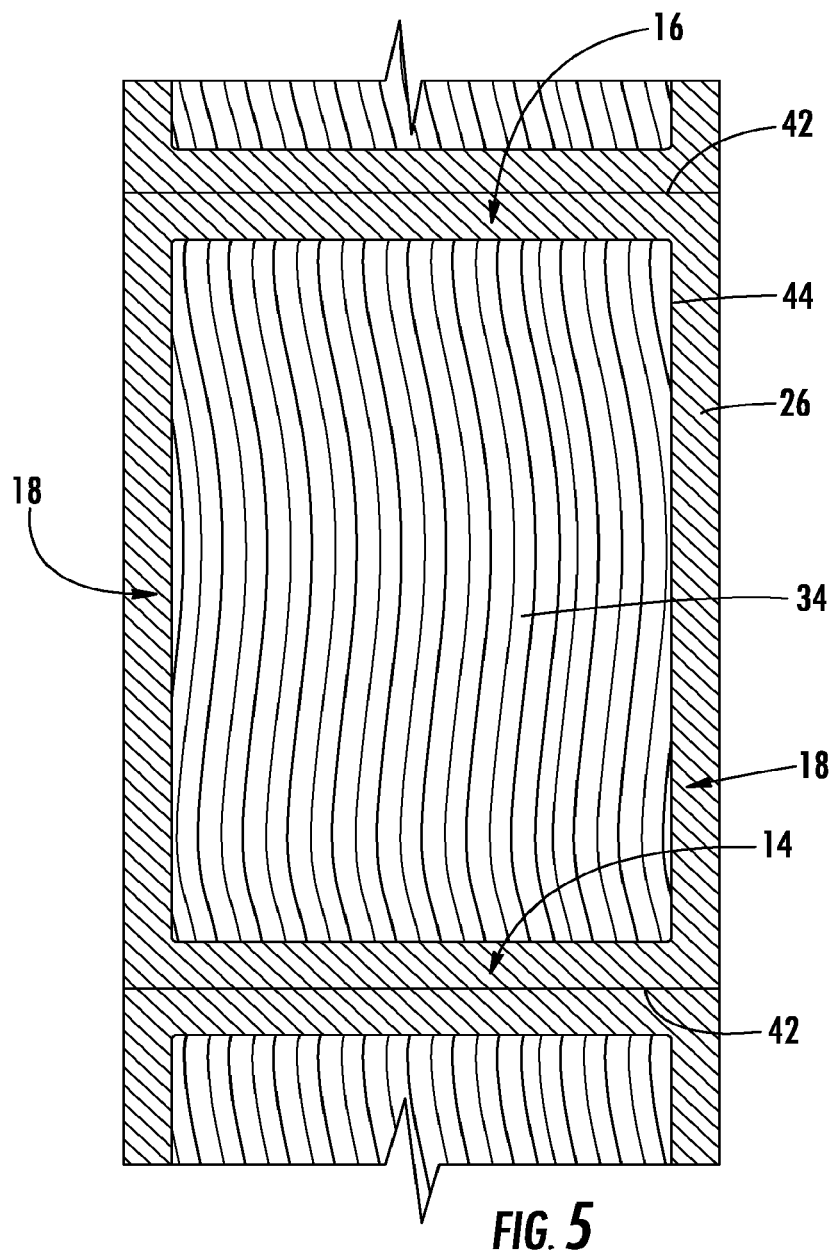
FIG. 5 is a top view of an alternative blank that may be used to form packages in an embodiment of the invention.

The packaging film 60 is advanced to a scoring station at which a first, or inner, score line 44 (FIGS. 4, 5) is formed through the thickness of the release liner 30, but does not extend into the laminate 20. One or more second, or outer, score lines 42 (FIGS. 4, 5) are formed through the thickness of the entire packaging film 60, defining the perimeter of the packaging structure 10. The skeleton or matrix disposed outside cut line 44 may then be disposed of. In an embodiment, the area disposed between cut line 44 and cut line 42 is adhesive-free on the inner surface of the packaging structure 10 and exposes the printable sealant 26. In an embodiment, cut line 44 is substantially the same shape as cut line 42. In an embodiment, cut line 44 is disposed interior of the perimeter of the packaging structure 10. In an embodiment, the area disposed between cut line 44 and cut line 42 comprises a seal area, for a fin seal 18 and end seals 14, 16.

In an embodiment, the first score line 44 is in registration with (i.e., coincides with) the outer perimeter of the pattern of adhesive 28.

The scoring station can comprise a laser. The depth of the score line formed by the laser can be regulated by regulating the power output or beam intensity of the laser beam, the width or spot size of the laser beam, and the amount of time a given spot on the film surface is irradiated by the beam. These factors generally are selected based on the characteristics of the material being scored. Some materials are more readily scored by lasers than other materials, as known in the art. As an alternative to the use of lasers for scoring the laminate, the score lines 42, 44 can be formed in the film 60 by mechanical scoring or cutting. For instance, a scoring station can comprise a kiss roll and backing roll that form a nip through which the laminate is passed. The kiss roll may comprise a rotary cutting die defining a cutting edge. After the scoring operations, the film 60 can be sent to a reel-up and wound into a roll for subsequent processing.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of manufacturing a blank for a package comprising:
   providing a film layer;
   providing a release liner comprising a substrate layer and a cured silicone layer;
   pattern applying an adhesive onto the film layer or the substrate layer of the release liner such that a perimeter region of the film layer remains adhesive-free;
   adhesively joining the film layer to the substrate layer of the release liner to form a laminate;
   advancing the laminate to a scoring station at which an inner score line is formed through the thickness of the release liner but does not extend into the film layer, wherein the inner score line is disposed interior of the perimeter region, and wherein an outer score line is formed through the thickness of the laminate; and
   removing a skeleton of the release liner, wherein the skeleton comprises the portion of the release liner exterior the inner score line, wherein after removal of the skeleton, a region between the inner score line and the outer score line comprises a seal region in which the film layer is exposed.

2. The method of claim 1, wherein the seal region is adhesive-free on its inner surface.

3. The method of claim 1, comprising forming the blank into a package by sealing the seal region to form a fin seal and two end seals.

4. The method of claim 3, wherein one or more reactive materials is filled into the package after formation of the fin seal and one of the end seals, but prior to sealing of the second end seal.

5. The method of claim 1, wherein the step of providing a film layer comprises coextruding an outer layer, a permanent adhesive, and a printable sealant.

6. The method of claim 1, wherein the seal region comprises the perimeter region of the film layer.

7. The method of claim 1 wherein the substrate layer comprises polyethylene terephthalate.

8. The method of claim 1 wherein the at least one film layer comprises an outer layer adhered to a printable sealant.

9. The method of claim 8 comprising coextruding the outer layer and printable sealant.

10. The method of claim 8 wherein the outer layer comprises biaxially oriented nylon.

11. The method of claim 8 wherein the printable sealant is print receptive.

12. The method of claim 8 wherein the printable sealant comprises polyethylene.

13. The method of claim 8 wherein the printable sealant is coextensive with the outer layer.

14. The method of claim 1 wherein a perimeter of the release liner is substantially aligned with an outer perimeter of the adhesive.

15. A method of manufacturing a package comprising:
   providing a film layer;
   providing a release liner comprising a substrate layer and a cured silicone layer;
   pattern applying an adhesive onto the film layer or the substrate layer of the release liner such that a perimeter region of the film layer remains adhesive-free;
   adhesively joining the film layer to the substrate layer of the release liner to form a laminate;
   advancing the laminate to a scoring station at which an inner score line is formed through the thickness of the release liner but does not extend into the film layer, wherein the inner score line is disposed interior of the perimeter region, and wherein an outer score line is formed through the thickness of the laminate;
   removing a skeleton of the release liner, wherein the skeleton comprises the portion of the release liner exterior the inner score line, wherein after removal of the skeleton, a region between the inner score line and the outer score line comprises a seal region in which the film layer is exposed; and
   forming the laminate into a package for reactive materials having a first end, a second end opposite the first end, and at least two side edges.

16. The method of claim 15 comprising forming the laminate into a tubular body by sealing the side edges together to form a fin seal, closing the first end to form an end seal, and closing the second end to form an end seal.

17. The method of claim 16, wherein one or more reactive materials is filled into the package after formation of the fin seal and the first end seal, but prior to forming the second end seal.

18. The method of claim 15 wherein the cured silicone layer faces an interior of the package.

* * * * *